United States Patent [19]
Kameyama

[11] Patent Number: 5,934,935
[45] Date of Patent: Aug. 10, 1999

[54] SWITCH BOX MOUNTING STRUCTURE

[75] Inventor: Isao Kameyama, Shizuoka, Japan

[73] Assignee: Yazaki Corporation, Tokyo, Japan

[21] Appl. No.: 08/841,664

[22] Filed: Apr. 30, 1997

[30] Foreign Application Priority Data

Apr. 30, 1996 [JP] Japan .................................. 8-109498

[51] Int. Cl.⁶ ................................................ H01R 13/74
[52] U.S. Cl. ............................................................ 439/535
[58] Field of Search .................................. 439/535–537, 439/540.1

[56] References Cited

U.S. PATENT DOCUMENTS

| | | | |
|---|---|---|---|
| 4,918,258 | 4/1990 | Ayer | 439/535 |
| 4,986,779 | 1/1991 | Ferrill et al. | 439/108 |
| 5,117,122 | 5/1992 | Hogarth et al. | 439/535 |
| 5,290,175 | 3/1994 | Robinson et al. | 439/535 |
| 5,397,929 | 3/1995 | Hogarth et al. | 439/535 |
| 5,434,740 | 7/1995 | Chan | 361/118 |
| 5,478,032 | 12/1995 | Miller | 248/27.1 |

FOREIGN PATENT DOCUMENTS 53-32969  3/1978  Japan .
53-39491  4/1978  Japan .

*Primary Examiner*—Gary F. Paumen
*Attorney, Agent, or Firm*—Sughrue, Mion, Zinn, Macpeak & Seas, PLLC

[57] ABSTRACT

A switch box mounting structure is provided that can eliminate erroneous assembling to connectors and reduce assembling time to a connector box. The switch box mounting structure includes: a panel that has a mounting hole; a connector box that is fixed to a back surface of the panel not only with a plurality of connectors attached thereto but also by setting an opening thereof to coincide with the mounting hole; and a switch box that allows a plurality of switches to be attached thereto. Not only the plurality of switches are attached to the connector box collectively through the switch box with the switch box being retained in the mounting hole from the front surface of the panel, but also the switches are engaged with the connectors.

8 Claims, 12 Drawing Sheets

SWITCH BOX MOUNTING STRUCTURE

BACKGROUND OF THE INVENTION

1. Field of the Invention

The present invention relates to a switch box mounting structure that allows a switch box to be mounted on a panel while it is engaged with connectors at the same time.

2. Description of the Related Art

Conventional male-female type switch boxes such as a hazard switch and a defogger switch are mounted onto a panel (an instrument panel or the like) of an automobile as shown in FIG. 12. Wires 5 are pulled frontward through a mounting hole 3 of a panel 1, and the connector 7 having the wires 5 connected thereto is engaged with a switch box 9. Then, the wires 5 are pushed back through the mounting hole 3, so that elastic retaining catches 11 of the switch box 9 are caused to be retained in edge portions of the mounting hole 3. As a result, the mounting of the switch box 9 is completed.

Therefore, in such a mounting structure, a complicated operation must be performed every time the switch box 9 is to be mounted. A mounting structure that has overcome this inconvenience allows a connector to be engaged with a switch box at the same time as the switch box is mounted onto a panel. One example of such a mounting structure, which is disclosed in Unexamined Japanese Utility Model Publication No. Sho. 53-32969, will be described with reference to FIG. 13.

This mounting structure is designed so that a junction connector box 15 is fixed to a mounting hole 3 of a panel 1. The junction connector box 15 has a frame-like front plate 19 around the outer periphery of the front opening 17 thereof. The junction connector box 15 has retaining catches 21 that confront the front plate 19 on the outer surfaces of the upper and lower walls thereof. The junction connector box 15 can be mounted onto the panel 1 by clamping the corresponding edge portions of the mounting hole 3 with the retaining catches 21 and the front plate 19 when inserted into the mounting hole 3 from the front surface of the panel 1 with the rear side thereof directed frontward.

Side surface openings 23 are formed at both side surfaces of the junction connector box 15. Further, in the inner surfaces of the upper and lower walls are a pair of long grooves 25 extending depthwise. On a connector 29 having electric cables 27 connected thereto is a collar portion 31, which is to be set into the long grooves 25. The connector 29 is inserted as follows. After the junction connector box 15 has been fixed to the panel 1, the collar portion 31 of the connector 29 is engaged with the long grooves 25 from the side surface openings 23 on the back of the panel 1. The junction connector box 15 allows two connectors 29 to be attached thereto by allowing both connectors 29 to be inserted from the side surface openings 23 arranged at both side surfaces, respectively.

The junction connector box 15 having the connectors 29 attached thereto then allows two switch boxes 33 to be inserted thereinto from the front surface of the panel 1. The inserted switch boxes 33 not only cause elastic retaining catches 35 to be retained by projections 37, but also connect terminals 38a to terminals 38b of the connectors 29, so that the switch boxes 33 can be electrically connected by operating knobs 39.

According to the above-constructed switch box mounting structure, the connectors 29 are fixed to the panel 1 by the junction connector box 15. Therefore, the switch boxes 33 can be mounted from the front surface of the panel 1 and at the same time, the switch boxes 33 can be engaged with the connectors 29. Hence, operability has been improved.

However, the aforementioned conventional switch box mounting structure is disadvantageous in that erroneous assembling to the junction connector box 15 is likely to occur. That is, when differently specified switch boxes 33 are to be mounted, the switch boxes 33 must be engaged with connectors 29 on an individual basis, and this may cause errors in the assembling process to the junction connector box 15.

Further, since the switch boxes 33 must be engaged with the connectors 29 on an individual basis, the assembling to the junction connector box 15 is time consuming.

SUMMARY OF THE INVENTION

The present invention has been made in view of the aforementioned problems. The object of the present invention is therefore to provide a switch box mounting structure that not only can eliminate erroneous assembling to connectors, but also reduce assembling time to the junction connector box, so that assembling reliability and assembling operability can be improved.

To achieve the above object, the present invention is applied to a switch box mounting structure that includes: a panel having a mounting hole; a connector box either being fixed to a back surface of the panel by setting an opening thereof to coincide with the mounting hole with a plurality of connectors attached thereto, or being formed integrally with the panel; and a switch box for allowing a plurality of switches to be attached thereto. In such switch box mounting structure, not only the plurality of switches are mounted onto the panel collectively through the switch box by retaining the switch box in the mounting hole from a front surface of the panel, but also the plurality of switches are engaged with the plurality of connectors.

In the above-constructed switch box mounting structure, for example, connectors are attached to the connector box; the connector box is fixed to the back surface of the panel; switches are attached to the switch box; the switch box is thereafter inserted into the mounting hole from the front surface of the panel to be retained in the panel. As a result, a plurality of switches can be mounted onto the panel collectively, and at the same time, individual switches can be engaged with the corresponding connectors.

BRIEF DESCRIPTION OF THE DRAWINGS

The preferred embodiments of the switch box mounting structures of the present invention, will now be described in detail with reference to the drawings.

DETAILED DESCRIPTION OF THE INVENTION

Figure 1:
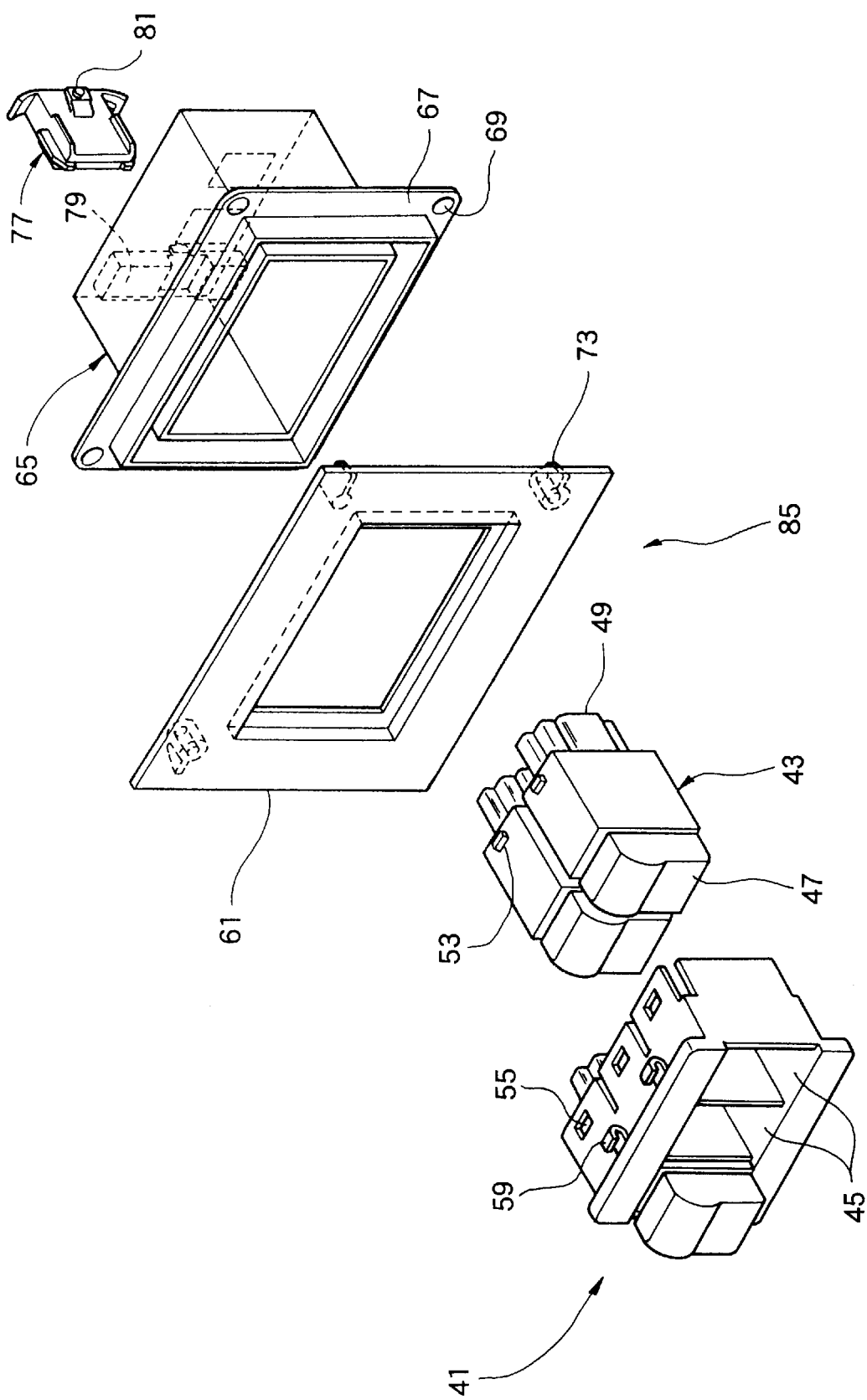
FIG. 1 shows an exploded perspective view showing a switch box mounting structure, which is a first mode of embodiment of the present invention.
Figure 2:
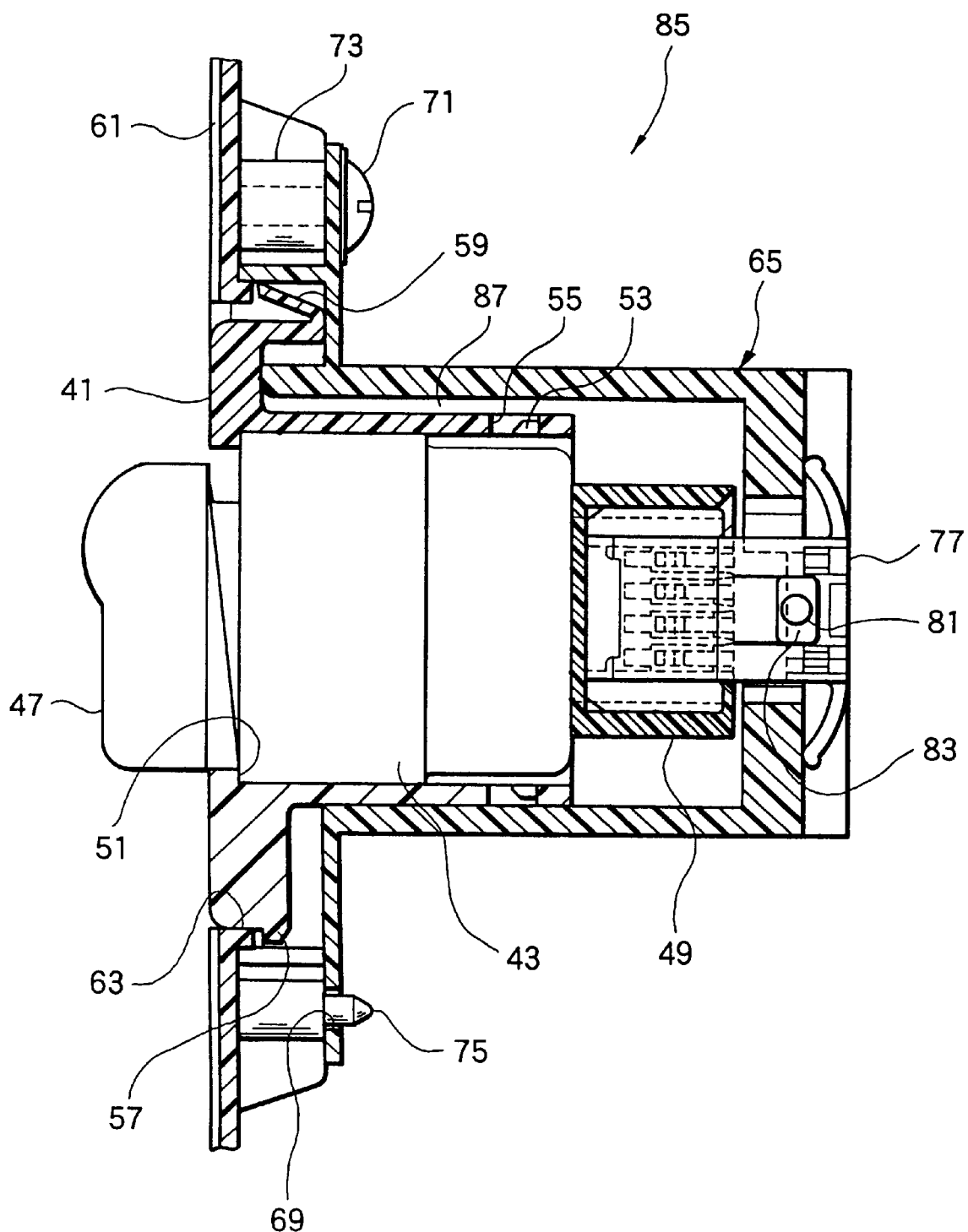
FIG. 2 shows a longitudinal sectional view showing an assembled condition of the switch box mounting structure shown in FIG. 1.
Figure 3:
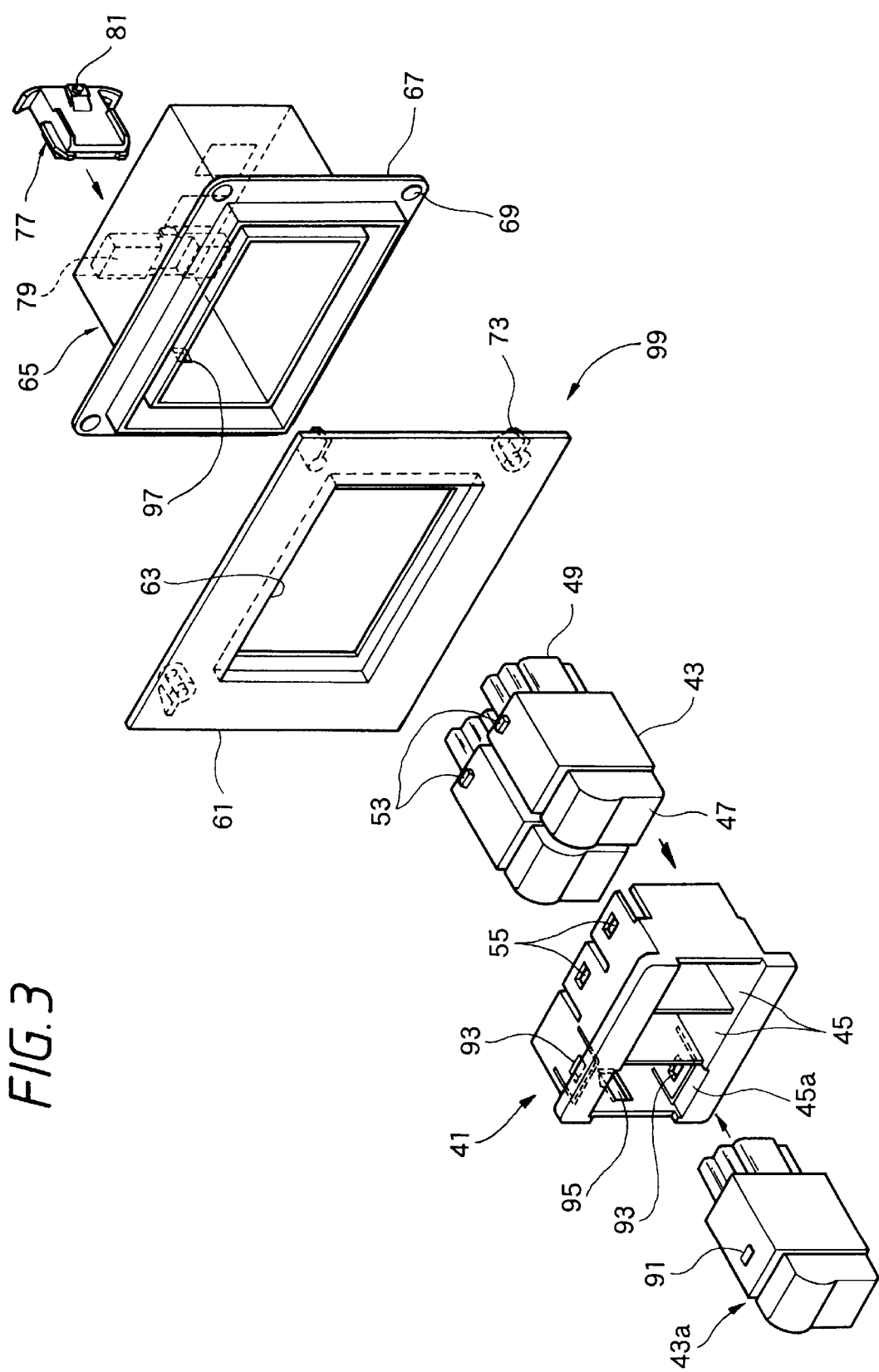
FIG. 3 shows an exploded perspective view showing a switch box mounting structure, which is a second mode of embodiment of the present invention.
Figure 4:
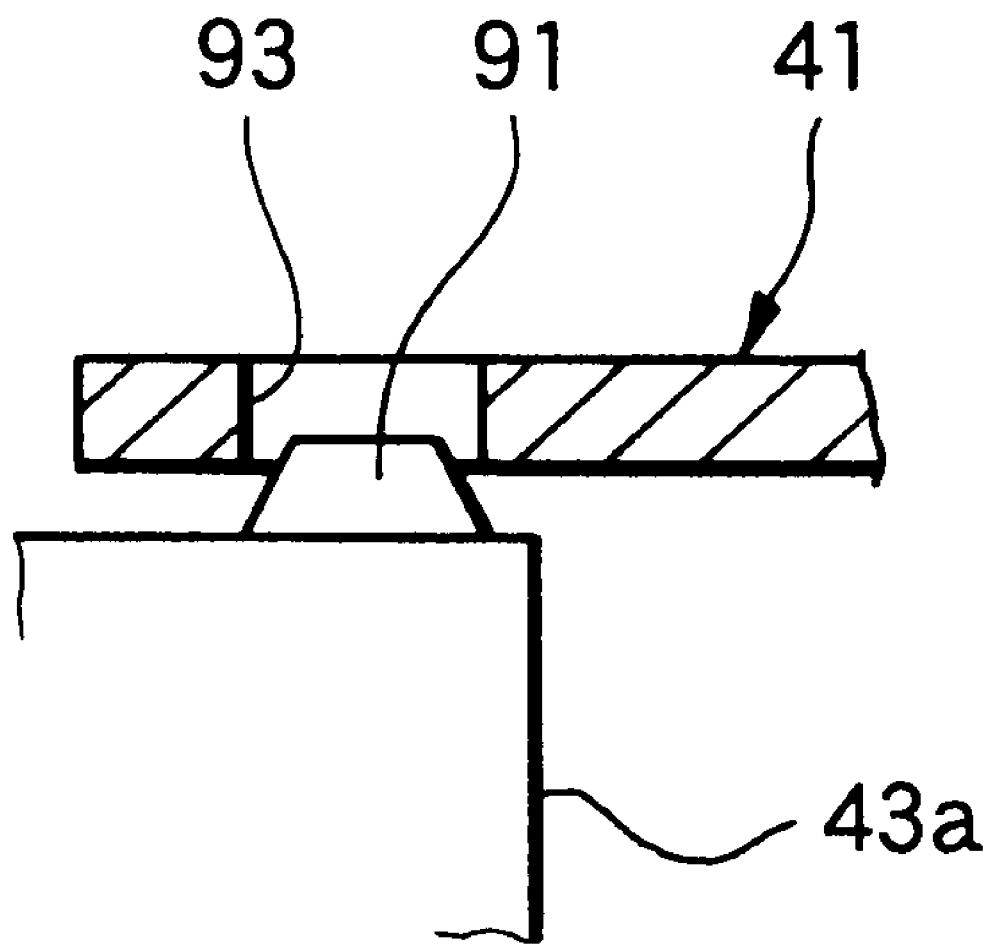
FIG. 4 shows an enlarged view of a semi-lock projection of the switch box mounting structure shown in FIG. 3.

FIG. 1 is an exploded perspective view showing a switch box mounting structure, which is a first embodiment of the present invention. FIG. 2 is a longitudinal sectional view showing an assembled condition of the switch box mounting structure shown in FIG. 1. A switch box. 41 has a plurality of switch accommodating chambers 45 so that a plurality of switches 43 can be accommodated therein. The switch accommodating chambers 45 have openings at both front and rear surfaces of the switch box 41.

A switch 43 has an operating button 47 arranged on the front side thereof and a built-in connector portion 49 arranged on the rear side thereof. The switch 43 is mounted onto the switch box 41 while inserted into the switch accommodating chamber 45 from the rear side of the switch box 41 with the operating button 47 thereof directed frontward. A stopper 51 (see FIG. 2) is formed at the inner front surface of the switch accommodating chamber 45, so that the stopper 51 prevents the switch 43 from coming off from the front side of the switch box.

Projections 53 are arranged on both upper and lower surfaces of the switch 43. The projections 53 regulate the coming off of the switch 43 from the rear side of the switch box 41 while retained in retaining holes 55 formed in the upper and lower walls of the switch box 41. A catch 57 is arranged so as to project from the lower front portion of the switch box 41. Further, an elastic retaining catch 59 is arranged on the upper front portion of the switch box 41. The elastic retaining catch 59 is formed by folding frontward the rear end portion that projects rearward from the base portion thereof. Therefore, the front end portion that is a free end is elastically displaceable up and down as viewed in FIG. 2.

A mounting hole 63 is arranged in a panel (instrument panel or the like) 61. The switch box 41 having the switches 43 attached thereto is mounted onto the mounting hole 63 while inserted into the mounting hole 63 from the front side of the panel 61. The catch 57 and the elastic retaining catch 59 regulate the coming off of the switch box 41 that has been inserted into the mounting hole 63 while retained in the upper and lower back sides of the mounting hole 63.

On the other hand, a connector box 65 is mounted on the back surface of the panel 61. The connector box 65 has a box-like shape and has an opening at the front surface thereof, and is mounted so that the front surface thereof coincides with the mounting hole 63. A flange portion 67 is formed around the outer periphery of the front portion of the connector box 65. Mounting holes 69 are formed in the flange portion 67. The connector box 65 is fixed to the back surface of the panel 61 by turning screws 71 inserted into the mounting holes 69 into mounting portions 73 formed on the back surface of the panel 61. Some of the mounting holes 69 may be fixed to the corresponding mounting portions 73 with the screws 71, or may otherwise have their movement regulated by inserting bosses 75 formed on the back surface of the panel 61 shown in FIG. 2.

Figure 14:
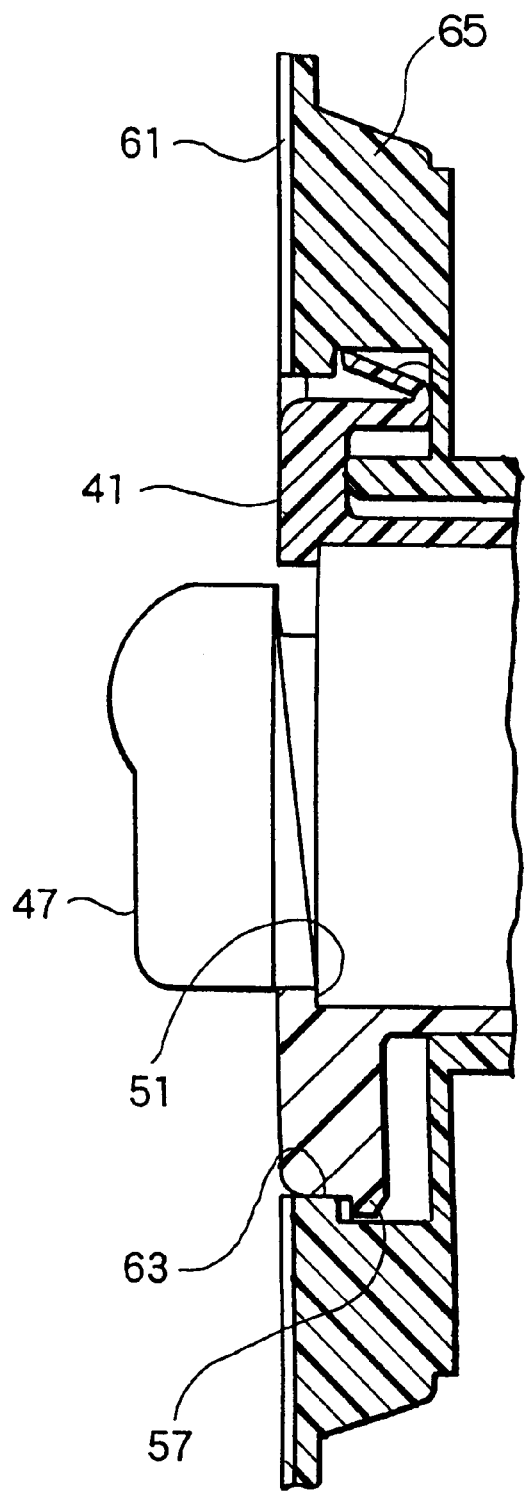
FIG. 14 shows a longitudinal sectional view showing the connector box and the panel formed integrally.

While the panel 61 and the connector box 65 are formed as independent pieces in this embodiment, the panel 61 and the connector box 65 may be formed integrally with each other as shown in FIG. 14.

Connector insertion holes 79 that allow connectors 77 to be inserted thereinto are formed in the rear surface of the connector box 65. A connector 77 is inserted into the connector insertion hole 79 from the rear side of the connector box 65. Further, the connector 77 is designed to be movable a predetermined distance along the rear surface of the connector box 65. A connector retaining lock 81 is arranged on a side wall of the connector 77, and the connector retaining lock 81 regulates the coming off of the connector 77 rearward while retained in a recess 83 formed in the edge portion of the connector insertion hole 79.

The connector box 65 mounted onto the panel 61 accommodates the aforementioned switch box 41 therein. The connectors 77 are arranged so as to coincide with the switches 43 accommodated in the switch box 41, respectively. That is, the switches 43 are designed to engage with the corresponding connectors 77 arranged in the connector box 65 at the same time as the switch box 41 is mounted onto the panel 61.

A procedure for assembling the thus constructed switch box mounting structure 85 will be described. First, connectors 77 are inserted into the connector insertion holes 79 of the connector box 65, and the connector retaining locks 81 are retained in the corresponding recesses 83. As a result, the connectors 77 are attached to the connector box 65.

Then, the connector box 65 is set to coincide with the mounting hole 63 from the back surface of the panel 61, and the screws 71 inserted into the corresponding mounting holes 69 are screwed into the corresponding mounting portions 73 in the back surface of the panel. As a result, the connector box 65 is fixed to the back surface of the panel 61. It may be noted that this part of assembling procedure is not required to be performed if the connector box 65 is integrally formed with the panel 61.

Then, switches 43 are inserted into the rear side of the switch box 41, and the projections 53 are retained in the corresponding retaining holes 55. As a result, the switches 43 are attached to the switch box 41.

As the last step of the procedure, the switch box 41 is inserted into the mounting hole 63 through the front side of the panel 61, so that the catch 57 and the elastic retaining catch 59 are retained in the back surface of the panel 61. As a result, the switch box 41 is fixed to the panel 61 and, at the same time, the built-in connector portions 49 arranged in the rear portions of the switches 43 are caused to engage with the corresponding connectors 77. Hence, the switch box 41 mounting operation is thus completed. If there is a mounting error in assembling the built-in connector portions 49 to the corresponding connectors 77, such error is fixed by the corresponding connectors 77 moving along the rear surface of the connector box 65, respectively. Therefore, the connectors 77 can engage with the built-in connector portions 49.

If the panel 61 is integrally formed with the connector box 65, the assembling procedure may be as follows. The switch box 41 having the switches 43 attached thereto is inserted into the panel 61 through the front surface of the panel 61. The connectors 77 are thereafter inserted into the connector insertion holes 79 from the rear side of the connector box 65 toward the corresponding switches 43, so that the connectors 77 can be retained by the connector box 65.

In order to remove the switch box 41 from the panel 61, the front portion of the switch box 41 is moved upward a distance that is equal to a gap 87 formed between the upper surface of the switch box 41 and the roof of the connector box 65. This movement squeezes the elastic retaining catch 59 which absorbs the upward movement of the switch box 41 by elasticity. By moving the switch box 41 upward a distance equal to the gap 87, the catch 57 on the lower portion of the switch box 41 is disengaged from the lower edge of the mounting hole 63. Then, by moving the switch box 41 downward, the elastic retaining catch 59 is disengaged from the upper edge of the mounting hole 63. As a result, the switch box 41 is removed from the panel 61.

According to the thus constructed switch box mounting structure 85, a plurality of switches 43 are mounted onto the switch box 41 in advance, i.e., pre-assembled, so that a plurality of switches 43 can be mounted collectively in the assembling process to the connector box 65. Therefore, by checking the mounting positions of the switches to the switch box 41 in advance, erroneous assembling of switches 43 can be eliminated in the assembling process to the connector box 65.

Further, by assembling a plurality of switches 43 to the switch box 41 in advance, such plurality of switches 43 can be assembled collectively in the assembling process to the connector box 65. As a result, assembling time can be reduced to a significant degree.

A second embodiment of the switch box mounting structure will be described next with reference to FIGS. 3 to 6. It may be noted that parts, components, and positions equivalent to those shown in FIGS. 1 and 2 are denoted as the same reference numerals, and duplicate descriptions will be omitted.

A front insertion type switch accommodating chamber 45a is formed at an arbitrary position of the switch box 41 (on the left end in this example). The front insertion type switch accommodating chamber 45a allows a front insertion type switch 43a to be inserted thereinto by removing the stopper 51 (see FIG. 2). Further, switch accommodating chambers 45 that allow switches 43 to be inserted thereinto from the rear side in a manner similar to the aforementioned example are also formed in the switch box 41.

Semi-lock projections 91 (see FIG. 4) are arranged so as to project from the upper and lower surfaces of the front insertion type switch 43a. Each semi-lock projection 91 is designed so that both surfaces thereof extending in the inserting direction are sloped. The semi-lock projection 91 is retained in a corresponding semi-lock hole 93 formed in the front insertion type switch accommodating chamber 45a. The semi-lock projection 91 is designed so that the retainment thereof in the semi-lock hole 93 can be released when a predetermined force is applied in the removing direction. That is, the front insertion type switch 43a that is inserted through the front surface of the switch box 41 can be removed from the switch box 41 by a pulling force that is larger than a predetermined value.

An elastic retaining catch 95 is arranged, e.g., on a side wall of the front insertion type switch accommodating chamber 45a. Further, there is no elastic retaining catch 59 and catch 57, both being arranged in the first embodiment, on the switch box 41. On the other hand, a retaining hole 97 that coincides with the elastic retaining catch 95 is formed in the connector box 65 that allows a plurality of connectors 77 to be attached to the rear portion of the connector box in a manner similar to the first embodiment. The switch box 41 is designed to be retained in the retaining hole 97 of the connector box 65 when retained in the mounting hole 63.

Figure 5:
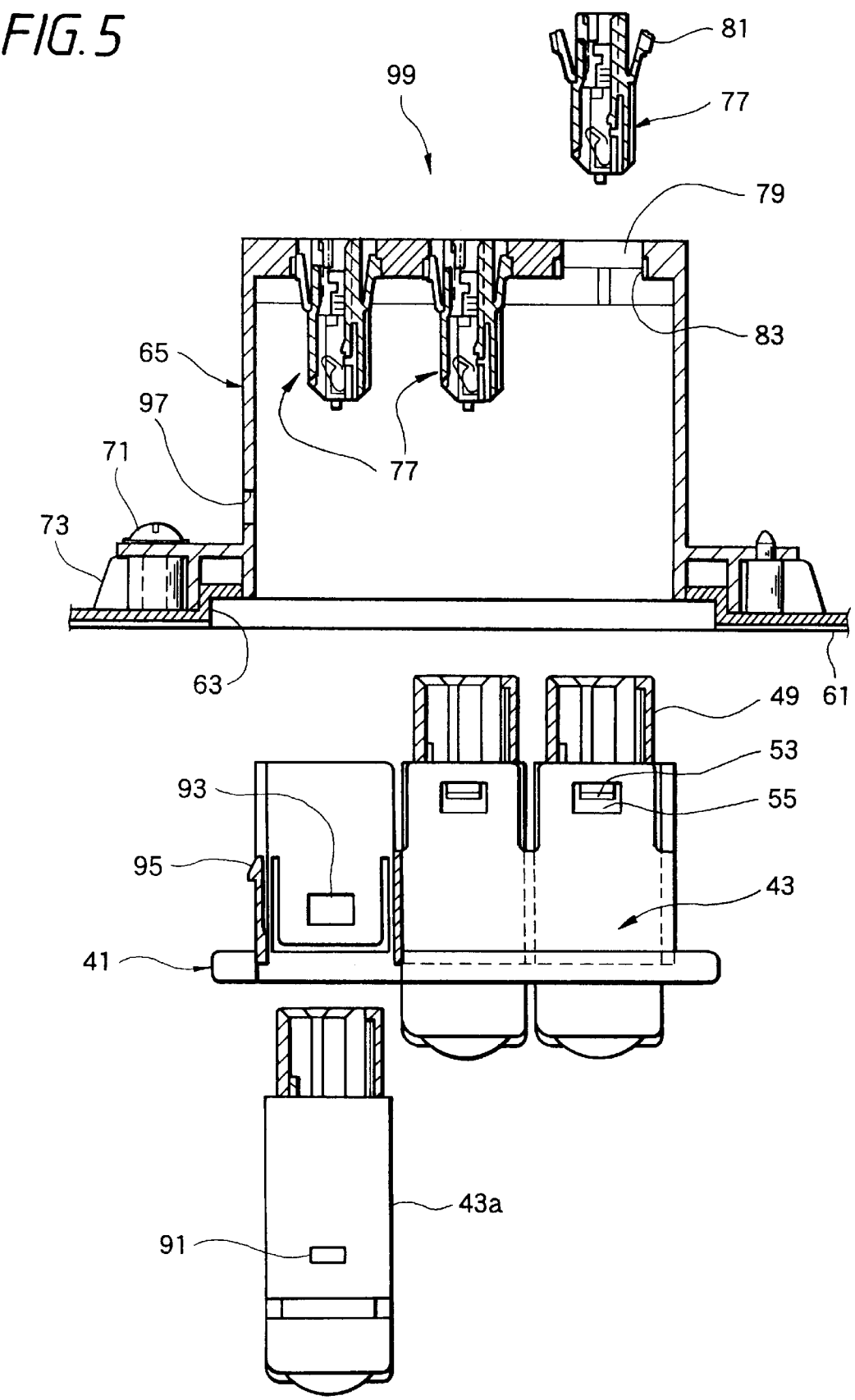
FIG. 5 shows a horizontal sectional view showing a mounted condition of a connector box of the switch box mounting structure shown in FIG. 3.

A procedure of assembling the thus constructed switch box mounting structure 99 will be described. First, as shown in FIG. 5, connectors 77 are inserted into corresponding connector insertion holes 79 of the connector box 65, and the connector retaining locks 81 are caused to be retained in the corresponding recesses 83. Thus, the connectors 77 are attached to the connector box 65.

Then, the connecter box 65 is set to coincide with the mounting hole 63 from the back surface of the panel 61, and the screws 71 inserted into the corresponding mounting holes 69 are screwed into the corresponding mounting portions 73 in the back surface of the panel. As a result, the connector box 65 is fixed to the back surface of the panel 61. It may be noted that this part of assembling procedure is not required to be performed if the panel 61 is integrally formed with the connector box 65.

Then, switches 43 are inserted from the rear side of the switch box 41, and the projections 53 are caused to be retained in the corresponding retaining holes 55. As a result, the switches 43 are attached to the switch box 41.

Figure 6:
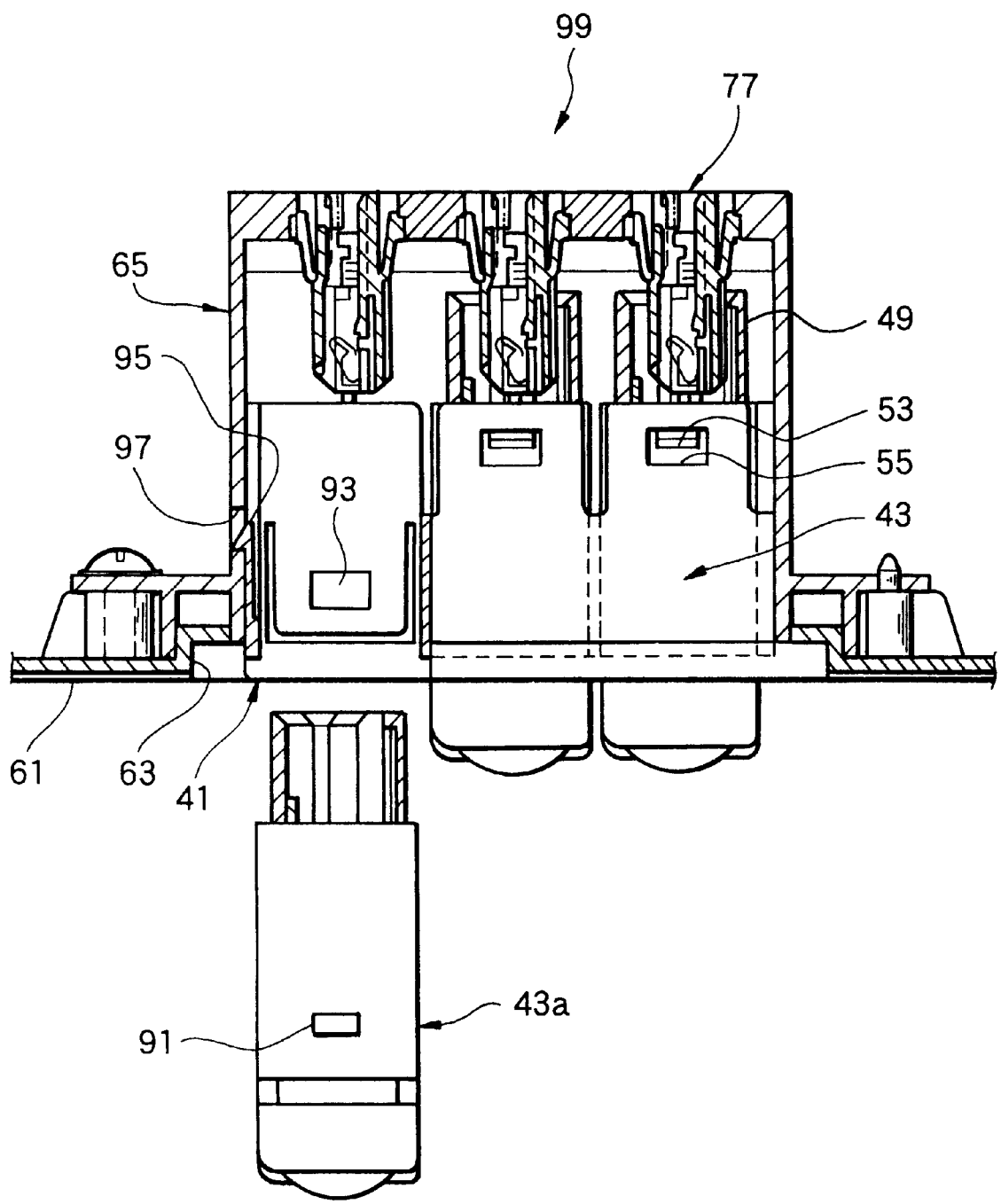
FIG. 6 shows a horizontal sectional view showing a mounted condition of the switch box of the switch box mounting structure shown in FIG. 3.
Figure 7:
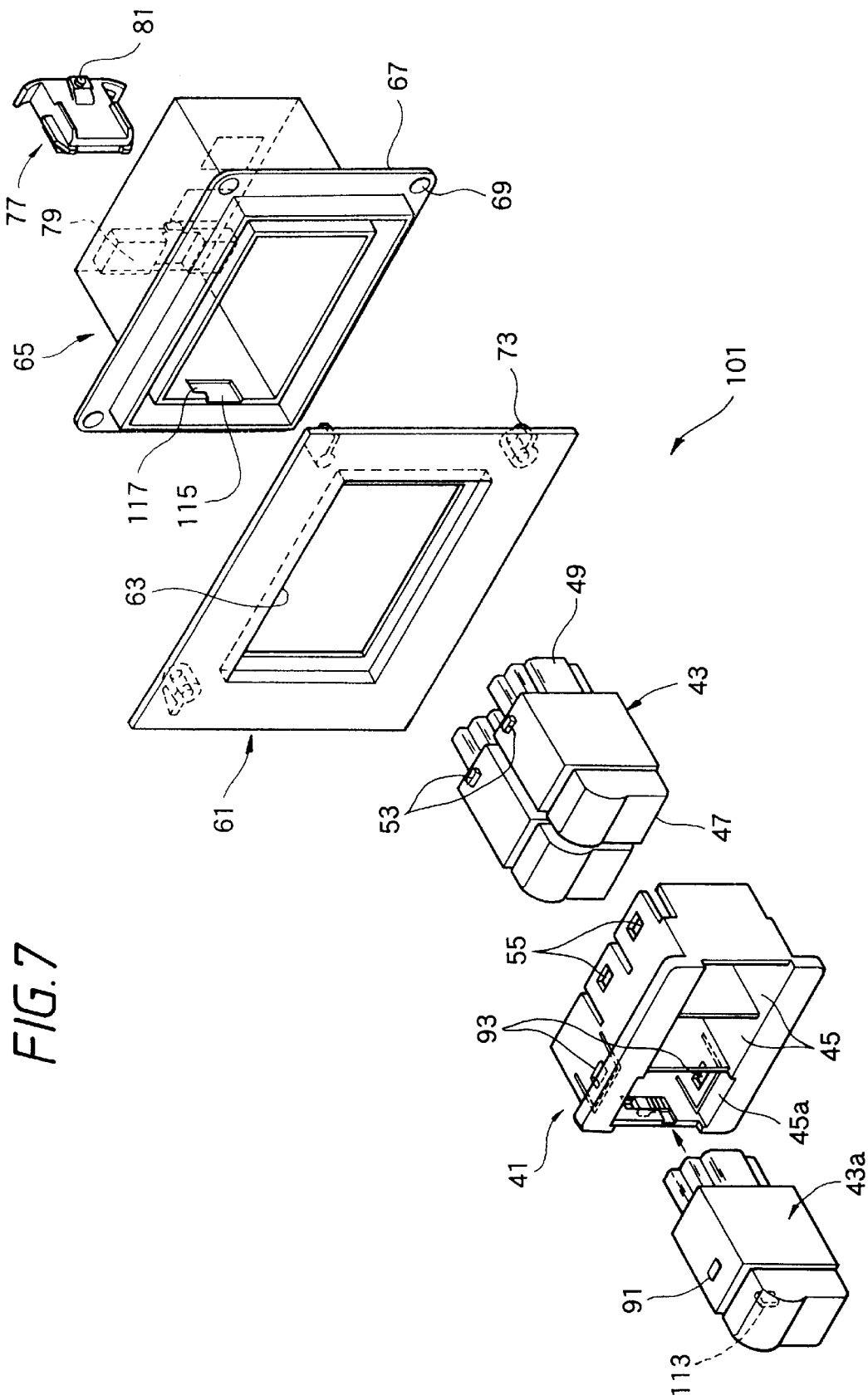
FIG. 7 shows an exploded perspective view showing a switch box mounting structure, which is a third embodiment of the present invention.

In this embodiment, the switch box 41 is inserted into the mounting hole 63, and the elastic retaining catch 95 of the switch box 41 is retained in the retaining hole 97 of the connector box 65, so that the switch box 41 is fixed to the connector box 65 as shown in FIG. 6.

As the last step, the front insertion type switch 43a is inserted into the front surface of the switch box 41, so that the semi-lock projections 91 are retained in the corresponding semi-lock holes 93. As a result, the front insertion type switch 43a is mounted onto the switch box 41.

To remove the switch box 41 from the panel 61, first, the front insertion type switch 43a is pulled out of the switch box 41 by releasing the elastic retaining catch 95 that has been exposed within the front insertion type switch accommodating chamber 45a using a finger, a tool, or the like. Then, the switch box 41 is pulled out of the connector box 65, and the switch box 41 is then removed from the panel 61.

In this switch box mounting structure 99, the elastic retaining catch 95 is exposed within the switch accommodating chamber 45a that has been emptied by pulling the front insertion type switch 43a out from the front surface of the panel 61, so that the elastic retaining catch 95 can be visibly checked. As a result, the retainment can be released easily. Hence, the switch box mounting structure 99 can not only prevent breakage of the lock structure but also improve unlocking operability compared with the switch box mounting structure in which the lock structure cannot be visibly checked and the unlocking operation is performed by gouging the switch box 41 while inserting a tool or the like.

While the switches 43 are fixed to the switch box 41 in advance before the switch box 41 is mounted onto the panel 61 in this mode of embodiment, the number and position of switches 43 to be fixed can be set arbitrarily. Further, while the front insertion type switch 43a is mounted after the switch box 41 has been mounted onto the panel 61, the number and position of the front insertion type switches 43a can be set arbitrarily. In the case where the front insertion type switch 43a is mounted in the middle of the switch box 41, the retaining holes 97 in which the elastic retaining catches 95 are retained may be formed in the upper and lower walls of the connector box 65.

A third embodiment of the switch box mounting structure will be described next with reference to FIGS. 7 to 11. It may be noted that parts, components, and positions equivalent to those shown in FIGS. 3 to 6 are denoted as the same reference numerals, and duplicate descriptions will be omitted.

In a switch box mounting structure 101 according to the third embodiment, one of the switches 43 (on the left end in this example) is constructed as a front insertion type switch 43a in a manner similar to the switch box mounting structure 99 according to the aforementioned second embodiment. Thus, in this switch box 41, a front insertion type switch accommodating chamber 45a that allows such front insertion type switch 43a to be inserted thereinto is formed.

Figure 8:
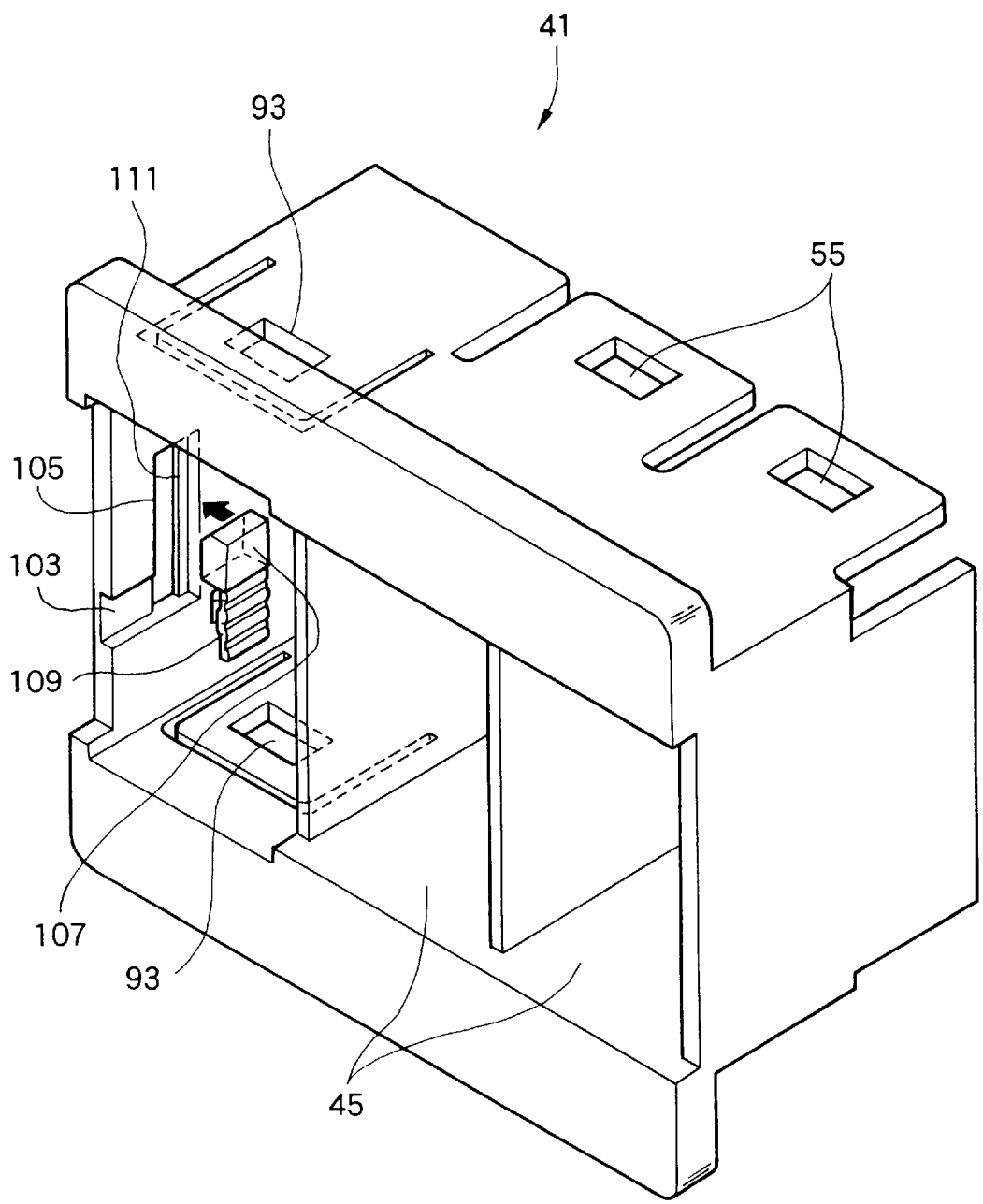
FIG. 8 shows an enlarged view of a switch box shown in FIG. 7.
Figure 9:
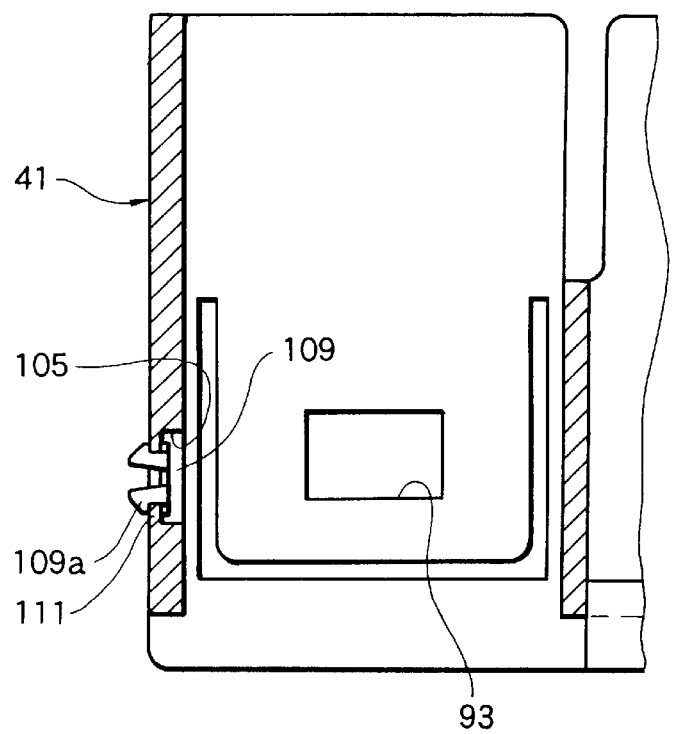
FIG. 9 shows a horizontal sectional view showing a slider shown in FIG. 8.
Figure 10:
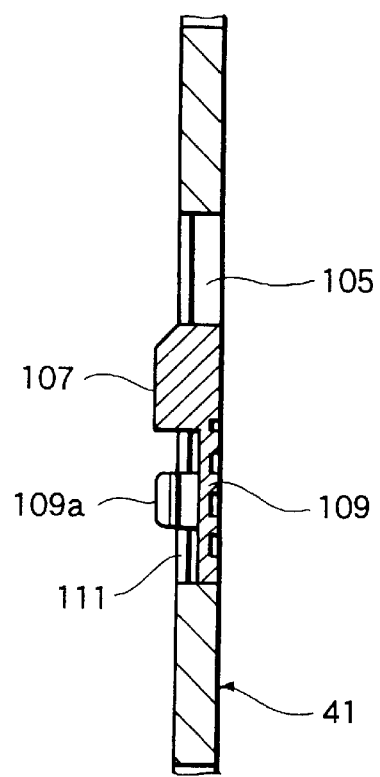
FIG. 10 shows a longitudinal sectional view showing the slider shown in FIG. 8.
Figure 11:
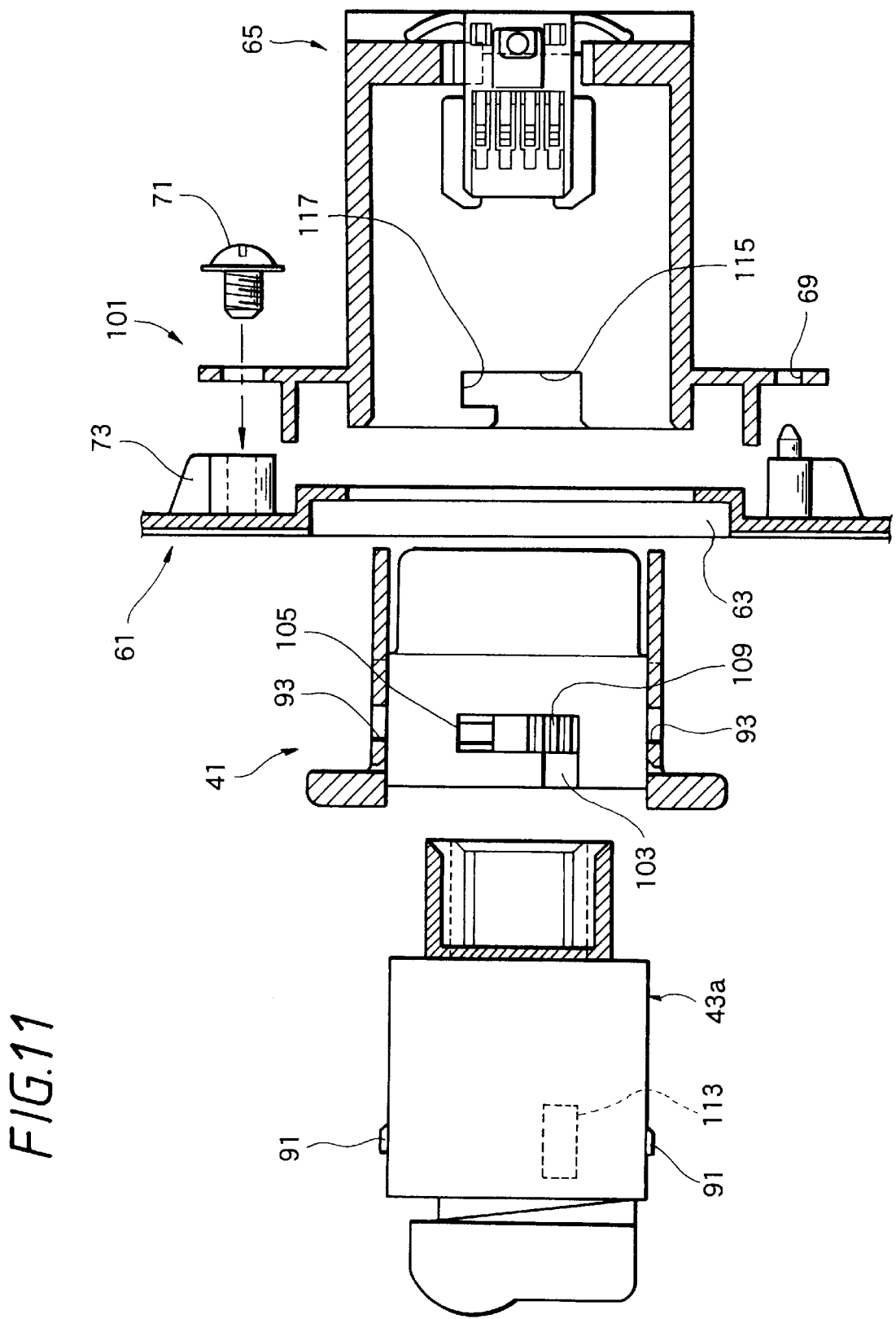
FIG. 11 shows an exploded longitudinal sectional view of the switch box mounting structure shown in FIG. 7.
Figure 12:
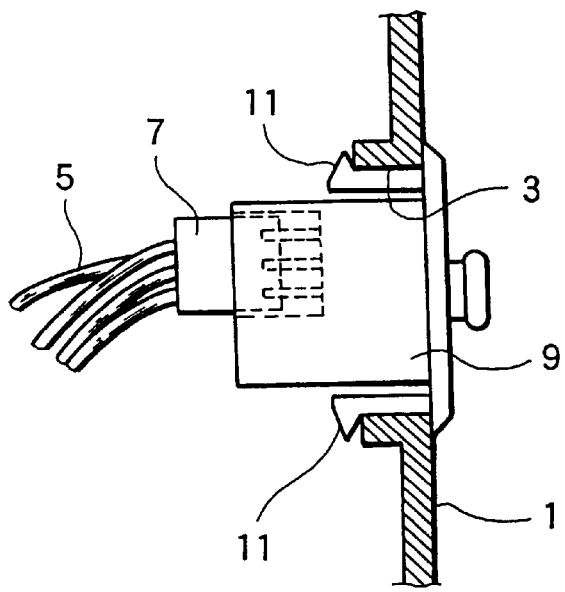
FIG. 12 shows a sectional view of a conventional switch box mounting structure.
Figure 13:
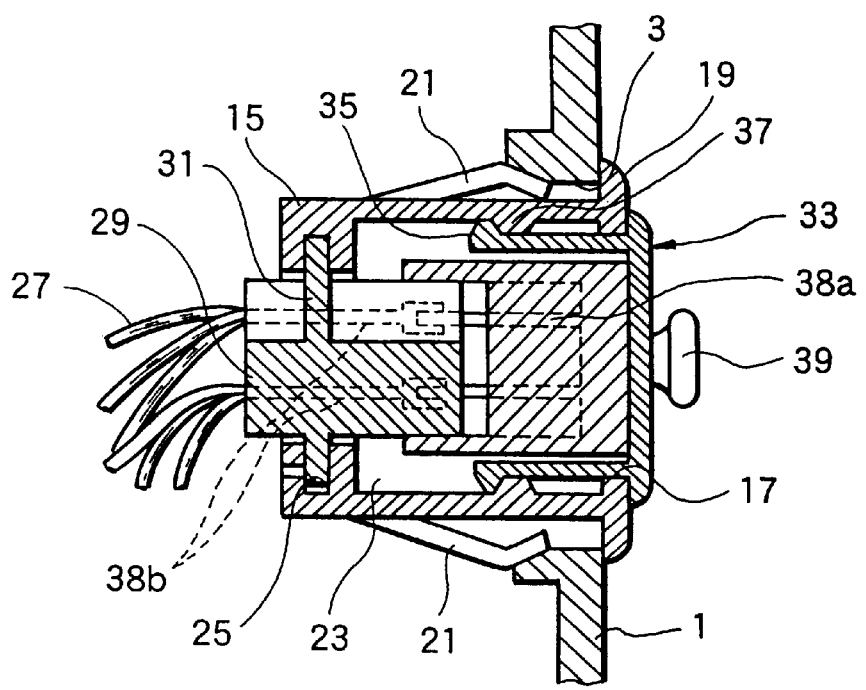
FIG. 13 shows a sectional view of another conventional switch box mounting structure.

As shown in FIG. 8, a long groove 103 that extends in the direction of inserting a switch 43a is formed in a side wall of the switch accommodating chamber 45a into which the front insertion type switch 43a is to be inserted. The terminating end of the groove 103 is connected to a slide groove 105 that extends upward along the side wall. An engaging portion 107 that is a sliding member has already been inserted into the slide groove 105, and the engaging portion 107 projects outward from the side wall. A slider 109 that is a sliding member is arranged continuously to the engaging portion 107. The slider 109 is slidably engaged with guide rails 111 formed in the slide groove 105 as shown in FIGS. 9 and 10.

The engaging portion 107 slides up and down along the slide groove 105 by operating the slider 109 from within the switch accommodating chamber 45a. It may be noted that the slider 109 has catches 109a engaged with the guide rails 111 through a predetermined frictional force so that the slider 109 is prevented from falling down by its own weight even when moving upward along the slide groove 105.

The slider 109 closes the terminating end of the groove 103 when set to the lower position of the slide groove 105. Further, the slider 109 opens the terminating end of the groove 103 when set to the upper position of the slide groove 105.

A projection 113 is arranged so as to project from the side surface of the front insertion type switch 43a. The projection 113 advances into the groove 103 in the side wall when the front insertion type switch 43a is inserted into the switch box 41 from the front surface of the switch box 41. Therefore, with the slider 109 set to the lower position of the slide groove 105, the projection 113 comes in contact with the slider 109 positioned at the terminating end of the groove 103, thereby blocking insertion of the switch 43a.

Further, when the slider 109 is set to the upper position of the slide groove 105, the projection 113 advances to the terminating end of the groove 103. As a result, the switch 43a can be inserted into a predetermined position within the switch box 41.

On the other hand, a groove portion 115 that allows the engaging portion 107 to be accommodated therein is formed in the connector box 65. The groove portion 115 is formed of a long portion that extends along the length of the connector box 65 and a recessed groove portion 117 notched in the upward direction. The groove portion 115 not only receives the engaging portion 107 with the slider 109 set to the lower position of the slide groove 105, but also retains the engaging portion 107 by allowing the engaging portion 107 to be retained in the recessed groove portion 117; i.e., by moving the slider 109 upward along the groove 105, the engaging portion 107 moves upward, and by retaining such engaging portion 107 in the recessed groove portion 117, the engaging portion 107 is prevented from detaching.

A procedure for assembling the thus constructed switch box mounting structure 101 will be described. First, connectors 77 are inserted into the corresponding connector insertion holes 79 of the connector box 65, so that the connector retaining locks 81 are retained in the corresponding recesses 83 (see FIG. 5). As a result, the connectors 77 are attached to the connector box 65.

Then, the connecter box 65 is set to coincide with the mounting hole 63 from the back surface of the panel 61, and the screws 71 inserted into the corresponding mounting holes 69 are screwed into the corresponding mounting portions 73 on the back surface of the panel. As a result, the connector box 65 is fixed to the back surface of the panel 61. It may be noted that this part of assembling procedure is not required to be performed if the panel 61 is integrally formed with the connector box 65 also in this mode of embodiment.

Then, switches 43 are inserted from the rear side of the switch box 41, so that the projections 53 are retained in the corresponding retaining holes 55. As a result, the switches 43 are attached to the switch box 41.

Under this condition, the switch box 41 is inserted into the mounting hole 63 from the front surface of the panel 61. At this time, by setting the slider 109 to the lower position of the slide groove 105, the engaging portion 107 is inserted along the groove portion 115 of the connector box 65.

After the switch box 41 has been inserted into the connector box 65, the slider 109 is slid upward along the slide groove 105, so that the engaging portion 107 is caused to be retained in the recessed groove portion 117 of the switch box 41. As a result, the switch box 41 is fixed to the connector box 65. Under this condition, the front insertion type switch 43a is inserted from the front surface of the switch box 41, and the projection 113 on the side wall of the switch 43a is caused to advance while set to coincide with the groove 103 of the switch box 41, so that the semi-lock projections 91 are caused to be retained in the semi-lock holes 93 of the switch box 41. Thus, the front insertion type switch 43a is mounted onto the switch box 41.

Under this condition, the projection 113 of the switch 43a is positioned at the terminating end of the groove 103, thereby blocking downward movement of the slider 109. As a result, the engagement of the engaging portion 107 of the switch box 41 with the recessed groove portion 117 of the connector box 65 is locked (unlockable).

Further, in order to remove the switch box 41 from the panel 61, the front insertion type switch 43a is pulled out of the front surface of the panel 61, and the slide groove 109 that has been exposed within the switch accommodating chamber 45a is slid downward along the slide groove 105. As a result, the engaging portion 107 is disengaged from the recessed groove portion 117 of the groove portion 115. Hence, the switch box 41 is ready to be removed from the panel 61.

According to this switch box mounting structure 101, the slider 109 that is a locking means of the switch box 41 can be visibly checked by pulling out the front insertion type switch 43a. Therefore, the switch box mounting structure 101 can not only prevent breakage of the lock member but also improve operability at the time of removing the switch box 41, compared with the switch box mounting structure requiring that the lock structure that cannot be visibly checked be unlocked by gouging with a tool or the like.

Further, in the mounting structure in which an elastic retaining catch or the like is arranged on the switch box 41, the switch box 41 must be pulled out while keeping the elastic retaining catch unlocked, and this makes the switch box 41 removing operation hard. The switch box mounting structure 101 according to this mode of embodiment has overcome this problem. That is, since the switch box 41 can be kept unlocked only by sliding the slider 109, the hard operation of pulling the switch box 41 out with the elastic retaining catch kept unlocked is dispensed with, which in turn allows the switch box 41 to be removed easily.

Still further, in the switch box mounting structure 101 according to the third embodiment, the switch box 41 is locked to the connector box 65 by moving the slider 109 to the upper position of the slide groove 105. Therefore, if the switch box 41 is fixed to the connector box 65 incompletely, the slider 109 interferes with the projection 113, thereby blocking insertion of the front insertion type switch 43*a*. As a result, the incompletely fixed condition of the switch box 41 and the connector box 65 can be detected.

While it is the structures for mounting the switch box 41 onto the panel 61 that have been described in the aforementioned first, second, and third modes of embodiment, the switch box mounting structure of the present invention can be utilized as a structure for mounting other electric components to a panel, e.g., for mounting a plurality of lamps or the like to a display panel. In addition, the connector box 65 and the panel 61 may be integrally formed with each other as described in the aforementioned first, second, and third modes of embodiment.

As described in the above detail, the switch box mounting structure of the present invention is characterized as allowing a plurality of switches to be mounted onto the connector box collectively in the switch assembling process to the connector box by mounting the a plurality of switches to the switch box in advance. As a result, by checking the switch mounting positions to the switch box in advance, erroneous assembling of switches can be eliminated in their assembling process to the connector box. Further, by assembling a plurality of switches to the switch box in advance, switch assembling time can be reduced to a significant degree in the switch assembling process to a panel.

What is claimed is:

1. A switch box mounting structure comprising:

a panel having a mounting hole;

a connector box being fixed to a back surface of said panel and having an opening which coincides with the mounting hole, said connector box having a plurality of connectors attached thereto; and a switch box for receiving a plurality of switches to be attached thereto wherein said switch box receives said plurality of switches prior to being attached to said panel so that said plurality of switches are substantially simultaneously engaged with said plurality of connectors when said switch box is fixed to said panel.

2. A switch box mounting structure according to claim 1, wherein one of said plurality of switches is releasable from a front surface of said switch box and wherein said mounting structure further comprises:

an elastic retaining catch formed on an inner wall portion of a switch accommodating chamber of said switch box into which the releasable switch is inserted from the front surface; and a retaining hole for retaining said elastic retaining catch formed on an inner wall of said connector box.

3. A switch box mounting structure according to claim 1, wherein one of said plurality of switches is releasable from a front surface of said switch box and wherein said mounting structure further comprises:

a long groove extending in a switch inserting direction formed in an inner wall portion of a switch accommodating chamber of said switch box into which the releasable switch is inserted from the front surface;

a slide groove formed on said switch box at a terminating end of said long groove and extending in a direction orthogonal to the switch inserting direction;

a projection portion on the releasable switch for advancing into said long groove;

a slide member that is slidable along said slide groove and projecting from an outer wall of said switch box; and a groove portion formed in an inner wall of said connector box for receiving said slide member and for regulating the removal of said slide member having moved along said slide groove.

4. A switch box mounting structure according to claim 1 wherein said connector box is formed integrally with said panel.

5. A switch box mounting structure according to claim 2 wherein said connector box is formed integrally with said panel.

6. A switch box mounting structure according to claim 3 wherein said connector box is formed integrally with said panel.

7. A switch box mounting structure according to claim 3 further comprising a recessed groove portion notched on an inner wall of said connector box in the upward direction of said groove portion which extends along the length of said connector box.

8. A switch mounting structure according to claim 3 further comprising a guide rail formed in said slide groove for slidably engaging with said slide member.

\* \* \* \* \*